United States Patent [19]
Baillie et al.

[11] Patent Number: 5,361,725
[45] Date of Patent: Nov. 8, 1994

[54] LITTER CONTAINMENT APPARATUS FOR KITTENS AND CATS

[76] Inventors: Robert A. Baillie; Suzanne M. Baillie, both of 448-B Heather Ct., Lakehurst, N.J. 08733

[21] Appl. No.: 178,410

[22] Filed: Jan. 6, 1994

[51] Int. Cl.$^5$ .............................................. A01K 1/01
[52] U.S. Cl. .................... 119/165; 119/161; 119/15
[58] Field of Search ............... 119/165, 161, 706, 15, 119/17, 19

[56] References Cited

U.S. PATENT DOCUMENTS

| | | | |
|---|---|---|---|
| 3,482,548 | 12/1969 | Burns | 119/706 |
| 3,885,523 | 5/1975 | Coleman | 119/165 |
| 4,301,766 | 11/1981 | Piccone | 119/83 |
| 5,042,430 | 8/1991 | Casmira | 119/165 |
| 5,092,270 | 3/1992 | Simons et al. | 119/165 |
| 5,165,366 | 11/1992 | Harvey | 119/165 |
| 5,195,464 | 3/1993 | Mutter | 119/165 |

*Primary Examiner*—John G. Weiss
*Attorney, Agent, or Firm*—Charles I. Brodsky

[57] ABSTRACT

A carryable enclosure having front, back and opposing side walls, at least one of which is provided with an entry opening to admit a kitten or cat to access a litter box supported within by a floor panel. Removable, and preferably, reversible dividers are provided to guide the kitten or cat to, and from, the litter box from the entry opening, over a course designed to trap and gather any litter accumulating on its fur and/or paws following from its use of the litter box. At least one of the walls, and/or an included top cover for the enclosure, is of a see-through construction to allow a breeder to observe the well being of the kittens and cats within the enclosure and the general sanitary conditions there.

12 Claims, 2 Drawing Sheets

LITTER CONTAINMENT APPARATUS FOR KITTENS AND CATS

FIELD OF THE INVENTION

This invention relates to the training and caring of kittens and cats and, more particularly, to litter containment apparatus for their use.

BACKGROUND OF THE INVENTION

As is well known and understood, breeders of pedigree kittens and cats are very concerned about the sanitary conditions existing during the 12-week or so time period where such felines are being weaned. Where the training of a kitten or cat to use a litter box is concerned, no effective measures are really available. In the one in typical use, for example, the kittens and cats are confined to a small room, with one or more litter boxes for use. In a second typical arrangement, the kittens and cats are confined to a cage, having its own litter box. As these animals are quite young, it is not unusual to find them curled up, asleep, in the litter box; when they rise, to leave the box, the litter is almost always strewn about. As is well appreciated by these professional breeders, whether the kittens or cats be kept in a room, or in a cage, the litter is found all over the place, and the area must be constantly cleaned and sanitized to maintain a healthy environment for the animals' well-being.

OBJECTS OF THE INVENTION

It is an object of the invention to provide a litter containment apparatus which overcomes these problems.

It is another object of the invention to provide such a litter containment apparatus which the professional breeder can easily carry about from room-to-room, as other litters of kittens are born.

It is an additional object of the invention to provide a litter containment apparatus which, at the same time, is helpful in the early stages of training of the new-born kitten, both as respects the use of a litter box and in its overall handling.

It is a further object of the invention to provide a litter containment apparatus which affords the breeder an opportunity to observe the kittens and cats within the apparatus—and the sanitary conditions within—from outside, and without having to open the apparatus.

It is yet an additional object of the invention to provide such a litter containment apparatus which, while particularly attractive for use by professional breeders of kittens, will prove attractive for use in the home care of older age cats, and attractive to the pet owner as well, desiring to maintain a "clean" area where the animal tends to use the litter box.

SUMMARY OF THE INVENTION

As will become clear from the following description, a litter containment apparatus embodying the invention comprises a carryable enclosure having front, back and opposing side walls, at least one of which is provided with an entry opening to admit a kitten or cat to access a litter box supported within by a bottom floor panel. Removable, and preferably, reversible dividers are provided to guide the kitten or cat to, and from, the litter box from the entry opening, over a course designed to trap and gather any litter accumulations on its fur and/or paws following from its use of the litter box. As will be seen, at least one of the walls, and/or an included top cover for the enclosure, is of a see-through construction to allow a breeder, or pet owner, to observe the well-being of the kitten and cat within, and the general sanitary conditions there.

As will be appreciated from the following description, a preferred embodiment of the invention utilizes a removable divider having a separate entry opening about which a plurality of bristles extend to remove litter accumulations on the fur of the kitten or cat. In such embodiment, the divider also assists in constraining the kitten or cat to walk over floor material of predetermined perforation, overlying an included collector pan, the perforation of which rubs the litter from the paws of the kitten or cat, and causes it to fall within the collector pan for later emptying. In an alternative version, the divider constrains the kitten or cat to walk across a fabric floor covering material having a friction characteristic to rub the litter from the paws of the kitten or cat, where it can then be gathered and disposed of. As will be appreciated by those skilled in the art, with either version, the dimensions selected for the enclosure can be tailored to correspond to the size of the kitten or cat—or deal with any other pet (e.g. ferret, rabbit, etc.) which uses a litter (or litter-type box) for its sanitary doings.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE DRAWINGS

Figure 1:
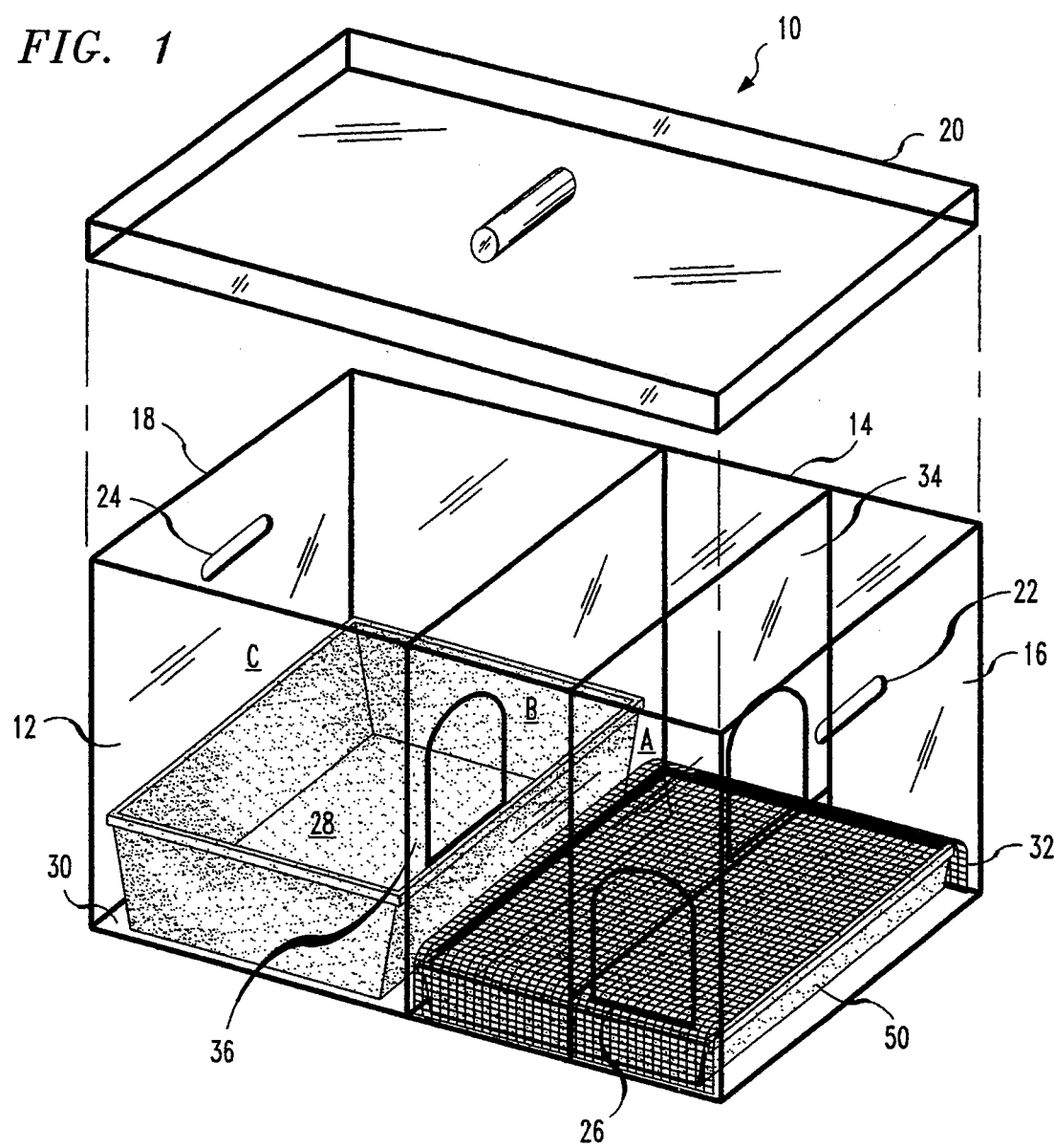
FIG. 1 is a perspective view of a preferred embodiment of a litter containment apparatus constructed in accordance with the teachings of the present invention.

In the drawings, the litter containment apparatus includes an enclosure 10 having front, back and opposing side walls 12, 14, 16, 18, respectively. A top cover 20, is configured to overly these walls in closing the enclosure 10, where desired. A pair of openings 22, 24 may be had in the side walls 16, 18 to grasp the enclosure 10 and to carry it about from room-to-room and place-to-place. (Obviously, other types of "handles" may be utilized in coupling to the enclosure for permitting it to be lifted and moved.)

A further opening 26 is shown cut within the lower right section of the front wall 12, of a size to accommodate entry by the kitten or cat intended to use the litter containment apparatus. As will likewise be apparent, such entry opening 26 could alternatively be placed in the back wall 14, or side walls 16, 18 for accessing the containment apparatus.

Figure 3:
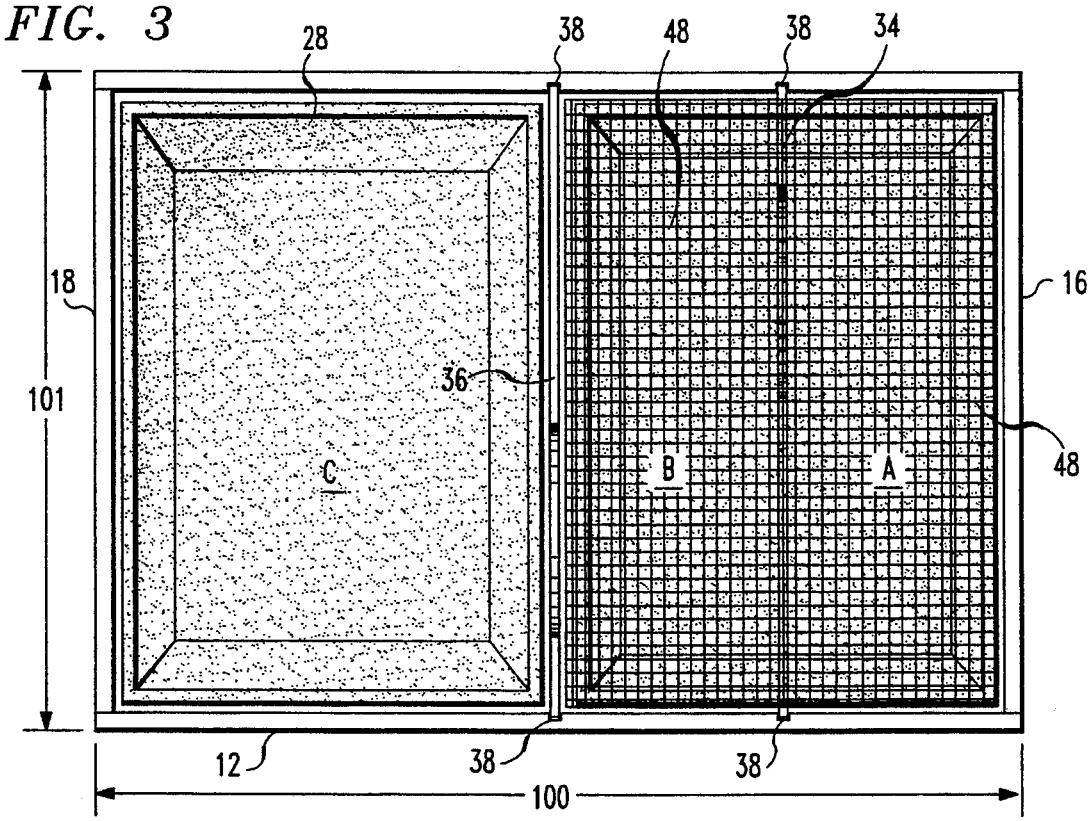
FIG. 3 is a top view of the litter containment apparatus of FIG. 1 (with its top cover removed) for the preferred construction employing a perforated flooring material for the gathering of litter accumulations.
Figure 4A:
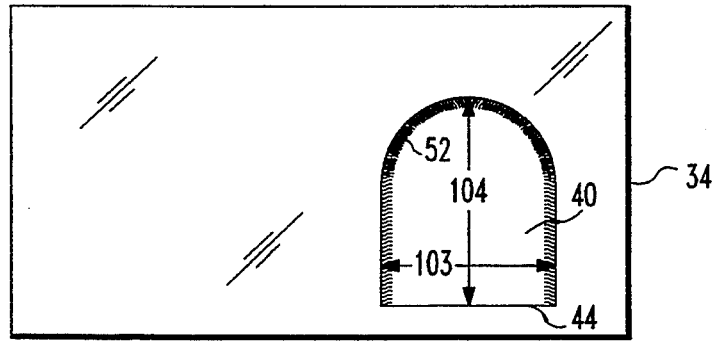
FIGS. 4a and 4b are front views of a pair of removable, reversible dividers as may be employed in the apparatus of FIG. 1.
Figure 4B:
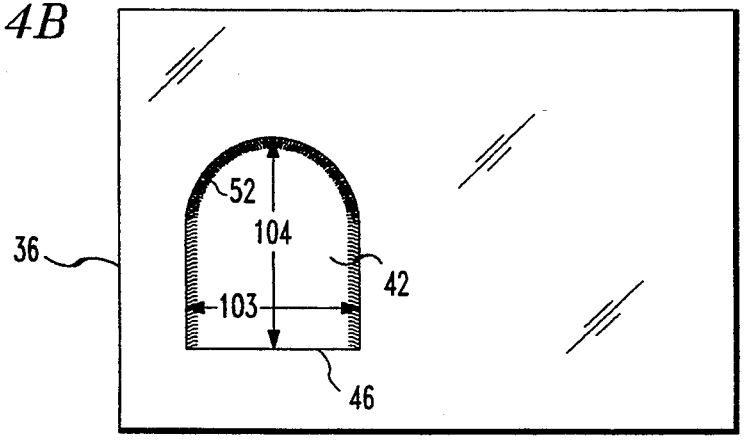

Also shown in the drawings is the cat litter box 28 as resting on a bottom floor panel 30 for the enclosure 10. As will be apparent, in its simplest form, first, the kitten or cat enters the opening 26, makes its way over a raised floor panel 32 (to be described) to access the litter box 28, and once finished there, to then return and exit through the opening 26. As will be understood by professional breeders, this can be considered the first step in training the kitten in the use of the litter containment apparatus of the invention. However, and in accordance with the invention, a pair of dividers 34, 36 are also incorporated as part of the enclosure 10—preferably removable from and reinsertable within the enclosure 10—and, also reversible in alignment. Clearly shown in FIG. 3, such dividers 34, 36 seat within a pair of slots 38 when inserted, and extend towards the top of the enclosure 10 to be held in place once the top cover 20 is in position. More particularly, and as shown in FIGS. 4a and 4b, the dividers 34, 36 are each provided with their own separate entry openings, 40, 42, through which the kitten or cat is constrained to pass when moving from the entry opening 26 to the litter box 28, and in returning therefrom. In the arrangement shown in FIG. 1, the animal will be seen to access the litter box 28 by entering the opening 26, walking across a portion of the raised floor panel 32 so as to pass the opening 40, traversing a different area of the floor panel 32, and then entering the litter box 28 through the opening 42. As will be appreciated, each of the dividers 34, 36 may be lifted out from the enclosure 10, and then reinserted in reverse direction so that the opening 40 would be adjacent to the front wall 12 (instead of to the back wall 14 as shown), just as the divider 36 can be reversed so that the opening 42 is adjacent to the back wall 14 (instead of the front wall 12, as illustrated). In either arrangement of the dividers 34, 36, however, it will be understood that the lower most portion 44 of the opening 40 is at the same approximate elevation above the bottom floor panel 30 as is the raised floor panel 32, so that the kitten or cat must walk from the illustrated compartment A to the illustrated compartment B; at the same time, it will be appreciated that the lower most portion 46 of the opening 42 is raised with respect to the elevation of the raised floor panel 32 so that the kitten or cat has to jump to get into the litter box compartment C and to return from it to the compartment B after use.

(While it will be apparent that the dimensions selected for the component parts of the enclosure are tailored to fit the animal expected to use it, it will also be appreciated that for the professional breeding of kittens and cats, the materials employed should allow for viewing of the animal and the sanitary conditions within the enclosure, from a position outside it. Thus, and in accordance with the invention, at least one of the walls 12, 14, 16, 18 might be of a see-through composition, of which the cover 20 might similarly be fabricated. In one actual construction, an acrylic, in the form of Lucite, was utilized for each of the walls 12, 14, 16 and 18, as well as for the top cover 20 and the removable dividers 34, 36.)

Figure 2:
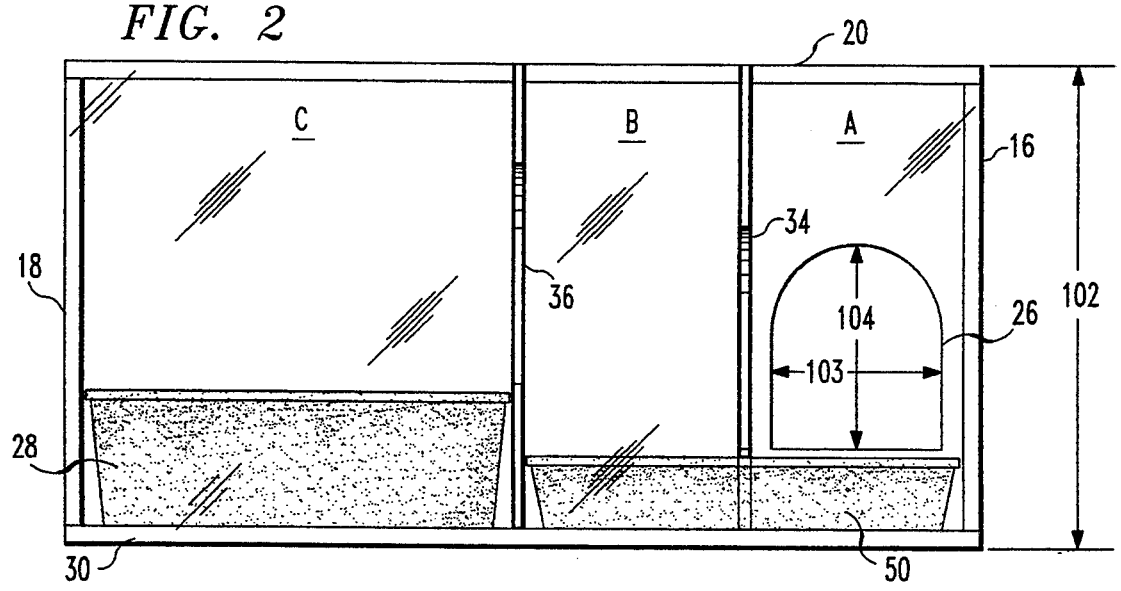
FIG. 2 is a front view, partially in section, of the litter containment apparatus of FIG. 1 without its top cover.

As will also be appreciated by those skilled in the art, the orientation of the dividers 34, 36 will train the new-born kitten by having to follow prescribed paths in getting to the litter box 28, and in leaving the enclosure by the entry opening 26. The raised section defined by the lower most portion 46 in the divider 36 also establishes a degree of training for the kitten in learning the need to "jump" to access various places. But, more importantly, such raised portion serves a further purpose in connection with the trapping and gathering of litter that may accumulate on the fur and paws of the kitten or cat in utilizing the litter box 28. In particular, and in accordance with a preferred embodiment of the invention, the further raised floor panel 32 is composed of a grid material of predetermined perforations 48 across which the kitten or cat is constrained to walk when going from the litter box 28 through the openings 40, 42 in the dividers 34, 36 so as to exit through the entry opening 26. Such perforated floor panel 32 overlies a collector pan 50 (FIG. 2) to gather any litter accumulations which would fall from the animal's fur or paws as it is caused to jump from the litter box 28 through the divider opening 42 and then walking via divider opening 40 to exit the opening 26. To empty the collector pan 50, all that is necessary is to raise the top cover 20, reach in to remove the floor panel 32 with its perforations 48, to then pick up the pan 50. In those instances where it is believed that such perforations 48 may irritate the soft paws of the new-born kitten, that floor panel 32 could be replaced, if desired, by one of a fabric floor material, having a friction characteristic of an extent to rub the litter from the paws of the kitten as it goes from the litter box 28 towards the entry opening 26. In such version, the captured litter remains on the fabric material of such paneling, where the floor can then be lifted out, without any need for utilizing the collector pan 50. In other words, such alternative floor paneling 32 would lack the grid or interstices afforded by the perforated version preferably embodying the invention.

In yet a further embodiment of the invention, each of the openings 40, 42 in the divider 34, 36 could be arranged to include surrounding bristles 52 about the opening, of any desired composition, to act in brushing off any litter accumulations that might be on the animal's fur. With the arrangements of the invention as described, these accumulations can either fall back into the litter box 28, fall through the perforations 48 of the floor paneling 32 if composed of a grid arrangement so as to end up in the collector pan 50, or just lay there on the fabric flooring if there composing the floor paneling 32. In one construction of the present invention, for use with new-born kittens, an enclosure constructed according to the invention, measured a length 100 of some 21½", a depth 101 of some 15¼" and a height 102 of some 12". Such enclosure was able to accommodate a litter box 28 some 14" long × 10" wide × 3" deep, along with a collector pan 50 of similar length and width, but 1½ deep. In such versions, dimensions 103, 104 for all openings 26, 40 and 42 were 4" and 6", respectively.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the scope of the invention.

We claim:

1. Apparatus comprising:

a carryable enclosure having a bottom floor panel, and also having front, back and opposing side walls;

a litter box in said enclosure supported by said bottom floor panel;

a first entry opening in at least one of said front, back and opposing side walls to admit a kitten or cat into said enclosure;

first and second divider walls in said enclosure between said entry opening and said litter box;

an entry opening in each of said first and second divider walls for guiding the kitten or cat from said first entry opening to, and from, said litter box over a predetermined path; and means, in said predetermined path, for trapping there any litter accumulations on said kitten or cat resulting from its use of said litter box.

2. The apparatus of claim 1 wherein at least one of said walls is of a see-through construction.

3. The apparatus of claim 2 wherein at least one of said walls is of an acrylic construction.

4. The apparatus of claim 1 wherein said enclosure also includes a top cover, and wherein at least one of said walls and said cover is of a see-through construction.

5. The apparatus of claim 1 wherein each of said divider walls is removable from said enclosure and reinsertable into said enclosure with its associated entry opening reversed.

6. The apparatus of claim 5 wherein the entry opening of each of said first and second divider walls includes a plurality of bristles for removing litter accumulations on the fur of said kitten or cat.

7. The apparatus of claim 1 wherein said means includes a raised floor material of predetermined perforation and an underlying collector pan supported by said bottom floor panel, wherein said first and second divider walls constrain the kitten or cat to walk across said raised floor material, and wherein said collector pan gathers litter falling through said perforations as said kitten or car exits said enclosure through said first entry opening.

8. The apparatus of claim 1 wherein there is also included a pair of handles for carrying about said enclosure.

9. The apparatus of claim 8 wherein said pair of handles include a pair of openings within said opposing side walls of said enclosure.

10. The apparatus of claim 1 wherein said enclosure additionally includes a pair of slots for seating said first and second divider walls, and wherein said top cover holds said divider walls in place.

11. The apparatus of claim 7 wherein each of said first entry opening and said entry openings of said first and second divider walls incorporate a lower-most portion, and wherein said raised floor material is at an elevation with respect to said bottom floor panel substantially less than the elevation with respect to said bottom floor panel of the lower-most portion of said divider wall closer to said litter box.

12. The apparatus of claim 11 wherein said raised floor material is also at an elevation with respect to said bottom floor panel substantially equal to the elevation with respect to said bottom floor panel of the lower-most portion of said divider wall closer to said first opening.

* * * * *